United States Patent [19]

Tilley et al.

[11] Patent Number: 5,346,767
[45] Date of Patent: Sep. 13, 1994

[54] ABRASION RESISTANT HIGHLY FILLED POLYESTER COMPOSITIONS

[75] Inventors: Mark G. Tilley, Evansville; Robert R. Gallucci, Mt. Vernon, both of Ind.

[73] Assignee: General Electric Company, Pittsfield, Mass.

[21] Appl. No.: 994,795

[22] Filed: Dec. 22, 1992

[51] Int. Cl.$^5$ ............................................. B32B 27/36
[52] U.S. Cl. ...................................... 428/412; 427/161; 427/393.5; 428/480; 428/524
[58] Field of Search ............................ 427/161, 393.5; 428/412, 480, 524

[56] References Cited

U.S. PATENT DOCUMENTS

| | | | |
|---|---|---|---|
| Re. 31,992 | 10/1985 | Ancker et al. | 523/202 |
| 2,465,319 | 3/1949 | Whinfield et al. | 260/75 |
| 2,901,466 | 8/1959 | Kibler et al. | 260/75 |
| 3,023,192 | 2/1962 | Shivers et el. | 260/75 |
| 3,047,539 | 7/1962 | Pengilly | 260/75 |
| 3,462,389 | 8/1969 | Schulde et al. | 106/293 X |
| 3,651,014 | 3/1972 | Witsiepe | 260/75 R |
| 3,763,109 | 10/1973 | Witsiepe | 260/75 R |
| 3,764,576 | 10/1973 | Russo | 106/306 X |
| 3,766,146 | 10/1973 | Witsiepe | 260/75 R |
| 3,784,520 | 1/1974 | Hoeschele | 260/75 R |
| 3,801,547 | 4/1974 | Hoeschele | 260/75 M |
| 3,935,081 | 1/1976 | Shotton | 204/30 |
| 3,953,394 | 4/1976 | Fox et al. | 260/40 R |
| 3,971,753 | 7/1976 | Frechfling et al. | 428/290 X |
| 3,971,763 | 7/1976 | Anderson | 260/45.9 |
| 3,986,997 | 10/1976 | Clark | 428/412 X |
| 4,043,971 | 8/1977 | Wurmb et al. | 260/40 R |
| 4,156,774 | 5/1979 | Buxbaum et al. | 528/273 |
| 4,197,335 | 4/1980 | Goossens | 427/162 |
| 4,264,761 | 4/1981 | McGirk | 528/300 |
| 4,278,804 | 7/1981 | Ashby et al. | 556/436 |
| 4,284,550 | 8/1981 | Mizuno et al. | 525/166 X |
| 4,293,479 | 10/1981 | Hanada et al. | 260/37 EP |
| 4,348,462 | 9/1982 | Chung | 428/412 |
| 4,351,758 | 9/1982 | Lu et al. | 524/227 |
| 4,353,817 | 10/1982 | Nakae et al. | 524/232 |
| 4,355,155 | 10/1982 | Nelson | 528/301 |
| 4,357,271 | 11/1982 | Rosenquist | 523/212 |
| 4,369,280 | 1/1983 | Dieck et al. | 524/281 |
| 4,379,190 | 4/1983 | Schenck | 428/95 |
| 4,444,931 | -4/1984 | Lu et al. | 524/227 |
| 4,483,958 | 11/1984 | Kosaka et al. | 524/409 |
| 4,491,508 | 1/1985 | Olson et al. | 528/26 X |
| 4,510,196 | 4/1985 | Carter, Jr. | 428/220 |
| 4,532,290 | 7/1985 | Jaquiss et al. | 524/417 |
| 4,548,979 | 10/1985 | Weise et al. | 524/403 |
| 4,556,688 | 12/1985 | McCready et al. | 525/33 |
| 4,556,705 | 12/1985 | McCready | 528/289 |
| 4,598,117 | 7/1986 | Liu et al. | 524/444 |
| 4,624,870 | 11/1986 | Anthony | 427/387 |
| 4,626,566 | 12/1986 | Miller et al. | 524/490 |

(List continued on next page.)

FOREIGN PATENT DOCUMENTS

| | | |
|---|---|---|
| 0019926 | 12/1980 | European Pat. Off. . |
| 0373465 | 12/1989 | European Pat. Off. . |
| 230252A3 | 11/1985 | Fed. Rep. of Germany . |
| 51-47739 | 12/1976 | Japan . |
| 52-80345 | 7/1977 | Japan . |
| 53-101038 | 9/1978 | Japan . |
| 53-102381 | 9/1978 | Japan . |
| 56-67363 | 6/1981 | Japan . |
| 60-23163 | 2/1985 | Japan . |
| 60-231763 | 11/1985 | Japan . |
| 63-119084 | 5/1988 | Japan . |
| 1-178540 | 7/1989 | Japan . |
| 2-284942 | 11/1990 | Japan . |
| WO8102579 | 9/1981 | PCT Int'l Appl. . |
| WO9207026 | 4/1992 | PCT Int'l Appl. . |

Primary Examiner—Michael Lusignan

[57] ABSTRACT

A method of coating is disclosed which is based on applying a composition which is based on colloidal silica dispersed in a silanol or methacrylic derived polymer system or an aminoplast resin to an article of a polybutylene terephthalate or polyethylene terephthalate, or blends of polybutylene terephthalate and polyethylene terephthalate, which optionally include a polycarbonate, or optionally include a polyether ester or polyetherimide ester and a heavy inorganic filler.

44 Claims, No Drawings

U.S. PATENT DOCUMENTS

| | | | |
|---|---|---|---|
| 4,639,486 | 1/1987 | Liu | 524/409 |
| 4,661,555 | 4/1987 | Koga et al. | 524/611 |
| 4,664,983 | 5/1987 | Nakamura et al. | 428/458 |
| 4,672,086 | 6/1987 | Seiler et al. | 524/127 |
| 4,687,692 | 8/1987 | Hepp | 428/137 |
| 4,687,802 | 8/1987 | Hepp | 524/411 |
| 4,714,657 | 12/1987 | Quinn et al. | 428/412 |
| 4,722,959 | 2/1988 | Inoue et al. | 524/412 |
| 4,732,928 | 3/1988 | Mizushiro et al. | 524/505 |
| 4,732,939 | 3/1988 | Hoshi et al. | 525/106 |
| 4,734,450 | 3/1988 | Kawai et al. | 524/413 |
| 4,760,112 | 7/1988 | McCready et al. | 525/33 |
| 4,780,402 | 10/1988 | Remmington | 430/533 |
| 4,790,965 | 12/1988 | Thursrud | 264/25 |
| 4,891,397 | 1/1990 | Liu | 524/141 |
| 4,891,399 | 1/1990 | Ohkawa et al. | 523/200 |
| 4,916,170 | 4/1990 | Nambu et al. | 523/137 |
| 4,988,740 | 1/1991 | Walter | 521/138 |
| 5,026,758 | 6/1991 | Grigo et al. | 524/423 |
| 5,132,353 | 7/1992 | Wallace | 524/432 |
| 5,139,817 | 8/1992 | Abe et al. | 427/393.5 X |
| 5,271,968 | 12/1993 | Coyle et al. | 427/393.5 X |

ABRASION RESISTANT HIGHLY FILLED POLYESTER COMPOSITIONS

BACKGROUND OF THE INVENTION

Highly filled polyester containing molding compositions having ceramic like properties may be formed into diverse articles for use in applications where repetitive contact with diverse objects may be anticipated. These articles may become scratched or abraded and it is desirable to provide abrasion resistant coatings which may be readily applied to formed articles in order to prevent damage and loss of gloss. In addition, it is also desirable to provide an abrasion resistant coating which will tenaciously adhere to the surface of a highly filled polyester based article and will also provide good surface gloss. Further criteria that are important in an abrasion resistant coating is the ability to resist staining and resist the effect of water and to protect the substrate from discoloration by exposure to light.

The applicants have discovered that particular coatings may be applied to a polyester based article to give it enhanced abrasion resistance.

The water resistance and tenacious adherence of these coatings on a highly filled polyester based resin article, which has ceramic like qualities were impossible to predict. This is because it is not possible to predict if a particular coating will have sufficient adherence so that it will adhere to a highly filled polyester resin containing composition.

Accordingly, it is a primary object of the invention to provide an abrasion resistant coating to a highly filled polyester based article.

It is also an object of this invention to provide an abrasion resistant coating to a highly filled polyester based article wherein the abrasion resistant coating adheres tenaciously to the surface.

It is also an object of this invention to provide an abrasion resistant coating for a highly filled polyester based article wherein the abrasion resistant coating has good adhesion in a water soak test.

It is also an object of this invention to provide an abrasion resistant coating for a highly filled polyester based article wherein the abrasion resistant coating has good stain resistance.

It is also an object of this invention to provide an abrasion resistant coating for a highly filled polyester based article wherein the abrasion resistant coating has good gloss.

These and other objects of the invention will become apparent from the specification.

SUMMARY OF THE INVENTION

The present invention provides a method of providing an abrasion resistant coating on an article which is formed from a composition which comprises:

(a) from 0–70 weight percent of a polybutylene terephthalate resin;

(b) from 0–70 weight percent of a polyethylene terephthalate resin, with the proviso that the sum of the amounts of the polybutylene terephthalate resin and the polyethylene terephthalate resin must be at least 10 weight percent of the total composition;

(c) from 0–35 weight percent of an aromatic polycarbonate resin and wherein the total weight of (a)+(b) is equal to or greater than the weight of (c);

(d) when (c) is greater 5 weight percent, then an effective amount of a stabilizer selected from the group consisting of phosphites, acidic phosphate salts, polyacid pyrophosphates and salts thereof; phosphate salts of a Group IB and IIB metal; and phosphorous oxo-acids;

(e) from 0–15 weight percent of a styrene-rubber impact modifier;

(f) from 0–35 weight percent of a polyether ester resin or a polyetherimide ester;

(g) from 30–80 weight percent of an inorganic filler selected from the group consisting of barium sulfate, strontium sulfate, zirconium oxide, zinc oxide and zinc sulfate; and (h) from 0–30 percent of a fibrous glass reinforcing filler, said method comprising applying to said composition a curable transparent coating selected from the group consisting of:

(a) a coating comprising a colloidal silica which is dispersed in a silanol and/or acrylic or methacrylic derived polymer system; or (b) a coating comprising an aminoplast resin; and thereafter curing said curable transparent coating under curing conditions which will cure said transparent coating.

Other preferred methods of providing an abrasion resistant coating include the coating of articles on articles formed from a composition which comprises:

(a) from 0–30 weight percent of a polybutylene terephthalate resin;

(b) from 0–30 weight percent of a polyethylene terephthalate resin, with the proviso that the sum of the amounts of the polybutylene terephthalate resin and the polyethylene terephthalate resin must be at least 10 weight percent of the total composition;

(c) from 10–30 weight percent of an aromatic polycarbonate resin;

(d) an effective amount of a stabilizer selected from the group consisting of phosphites, acidic phosphate salts, polyacid pyrophosphates and salts thereof, phosphate salts of a Group IB or Group IIB metal and phosphorous oxo-acids;

(e) from 0–10 weight percent of a styrene-rubber impact modifier;

(f) from 30–79.99 weight percent of an inorganic filler selected from the group consisting of barium sulfate, strontium sulfate, zirconium oxide and zinc sulfate; and (g) from 0–30 percent of a fibrous glass reinforcing filler; said method comprising applying to said composition a curable transparent coating selected from the group consisting of:

(a) a coating comprising a colloidal silica which is dispersed in a silanol and/or acrylic or methacrylic derived polymer system; or (b) a coating comprising an aminoplast resin; and thereafter curing said curable transparent coating under curing conditions which will cure said transparent coating.

The preferred transparent coatings are:

(A) a coating composition which is a dispersion of colloidal silica in a lower aliphatic alcohol-water solution of the partial condensate of a silanol of the formula $RSi(OH)_3$ in which R is selected from the group consisting of alkyl radicals of 1 to 3 carbon atoms, a vinyl radical, 3,3,3-trifluoropropyl radical, a gamma-methacryloxypropyl radical, at least 70 percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0; and (B) a silica-containg composition having an alkaline pH, comprising a water/aliphatic alcohol dispersion of ammonium hydroxide-stabilized colloidal silica and a partial condensate derived from organotrialkoxy silanes;

(C) an ultraviolet light curable coating which comprises 1–60 weight percent colloidal silica; 1–50 weight percent of the material produced by the hydrolysis of silyl acrylate and 25–90 weight percent of an acrylate monomer and 0.1–5 weight percent of a UV photoinitiator; or an ultraviolet light curable coating which comprises 100 parts by weight of colloidal silica; 5 to 500 parts of an acryloxy functional silane or glycidoxy functional silane; 10–500 parts by weight of a non-silyl acrylate and a catalytic amount of a light sensitive photoinitiator; and (D) a coating composition which is a reaction product of an aminoplast derived component and a polyester polyol consisting essentially of the reaction products of diacids and diols wherein said diacids comprise at least 50% by number of aliphatic acids in which the carbon atoms containing hydroxyl groups are separated by at least two intervening carbon atoms, and wherein the hydroxyl number is from about 50 to about 175; and thereafter curing said coating under curing conditions.

DETAILED DESCRIPTION OF THE INVENTION

Coating (A) is an acidic dispersion of colloidal silica and hydroxylated silsequioxane in an alcohol-water medium. More particularly, the coating composition comprises a dispersion of colloidal silica in a lower aliphatic alcohol-water solution of the formula RSi(OH)$_3$ in which R is selected from the group consisting of alkyl radicals of 1 to 3 carbon atoms, a vinyl radical, a 3,3,3-trifluoropropyl radical, a gamma-glycidoxypropyl radical and a gamma-methacryloxypropyl radical, at least 70 percent of the silanol being CH$_3$Si(OH)$_3$, said composition containing 10 to 50 weight percent solids consisting essentially of 10 to 70 weight percent colloidal silica and 30 to 90 weight percent of the partical condensate, said composition containing sufficient acid to provide a pH in the range of 3.0 to 6.0. These coatings are described in U.S. Pat. No. 3,986,997 which is incorporated by reference.

Coating B is a silica containing coating composition comprising from about 10 to 50 weight percent solids dispersed in a water/aliphatic alcohol mixture wherein the solids comprise about 10 to 70 weight percent ammonium hydroxide stabilized colloidal silica and about 30 to 90 weight percent of a partial condensate derived from an organotrialkoxy silane of the formula R'Si(OR)$_3$ wherein R' is selected from the group consisting of alkyl radicals of from 1 to 3 carbon atoms and aryl radicals of from 6 to 13 carbon atoms and R is selected from the group consisting of alkyl radicals of from 1 to 8 carbon atoms and aryl radicals of from 6 to 20 carbon atoms, said composition having a pH of from about 7.1 to 7.8. These types of coating compositions are described in U.S. Pat. No. 4,624,870 which is incorporated by reference.

Coating C is an ultraviolet light curable coating which comprises 1 to 60 percent colloidal silica; 1 to 50 percent of the material produced by the hydrolysis of silyl acrylate and 25 to 90 weight percent of an acrylate monomer and 0.1 to 5 weight percent of a UV photoinitiator. Preferred compositions are derived from aqueous colloidal silica, 2-methacryloxy-propyltrimethoxysilane, hexanediolacrylate, and a photosensitizing amount of a photoinitiator. These materials are disclosed in U.S. Pat. No. 4,491,508, which is incorporated by reference. In addition Coating C may be an ultraviolet light curable coating which contains 100 parts by weight of colloidal silica; 5–500 parts by weight an acryloxy functional silane or glycidoxy functional silane; 10–500 parts by weight of a non-silyl acrylate and a catalytic amount of an ultraviolet light sensitive photoinitiator. Preferred compositions are based on aqueous colloidal silica, methacryloxypropyl trimethoxysilane, hexanedioldi-acrylate, a glycidyloxy functional silane, and a cationic photoinitiator. These type of compositions are disclosed in U.S. Pat. No. 4,348,462 and in U.S. Pat. No. 4,491,508 which are incorporated by reference.

These coatings may also be modified to contain an ultraviolet light absorbing agent, for example, those of the type described in U.S. Pat. No. 4,278,804, which is incorporated by reference.

Coating D is a reaction product of an aminoplast derived component; and a polyester polyol consisting essentially of the reaction products of diacids and diols wherein said diacids comprise at least 50% by number aliphatic diacids in which the carboxylic acid groups are separated by at least two intervening carbon atoms, said diols comprising at least 50% by number aliphatic diols in which the carbon atoms containing hydroxyl groups are separated by at least two intervening carbon atoms, and wherein the hydroxyl number is from about 50 to about 175. In addition, this coating may comprise a catalyst, a reaction stabilizer, one or more ultraviolet light stabilizers or absorbers; and other additives or reactants.

A preferred aminoplast is hexamethoxymethylmelamine which is commercially available as Cymel 301 from American Cyanamid Company which may be combined with polyols such as 1,4-butanediol; 1.6-hexanediol; neopentyl glycol; trimethylolpropane in a suitable solvent and a catalyst such as p-toluenesulfonic acid or a polyester polyol of neopentyl glycol and adipic acid in the presence of a suitable solvent such as butyl cellosolve. The composition may be dip coated onto the substrate at a thickness of about 1 ml and cured in a hot air oven. A preferred curing method comprises the use of a hot air oven at 130° C. These coatings are described in U.S. Pat. No. 4,714,657 which is hereby incorporated by reference.

Polyesters generally for use in forming articles which are to be coated according to the invention are derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeated units of the following general formula:

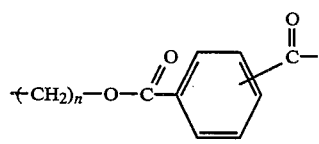

wherein:

n is an integer of from 2 to 6. The most preferred polyesters are poly(ethylene terephthalate) and poly(1,4,butylene terephthalate).

Also contemplated herein are the above polyesters with minor amounts, e.g., from 0.5 to about 5 percent by weight, of units derived from aliphatic acids and/or aliphatic polyols to form copolyesters. The aliphatic polyols include glycols, such as poly(ethylene glycol). All such polyesters can be made following the teachings of, for example, U.S. Pat. Nos. 2,465,319 and 3,047,539.

The polyesters used herein have an intrinsic viscosity of from about 0.4 to about 2.0 dl/g as measured in a 60:40 phenol/tetrachloroethane mixture or similar solvent at 23°–30° C.

The high molecular weight aromatic polycarbonate resins are well known compounds which are described along with methods for their preparation in U.S. Pat. Nos. 3,989,672; 3,275,601 and 3,028,365, all of which are incorporated herein by reference.

They may be conveniently prepared by the reaction of at least one dihydric phenol and a carbonate precursor. The dihydric phenols employed in the practice of this invention are known dihydric phenols which may be represented by the general formula:

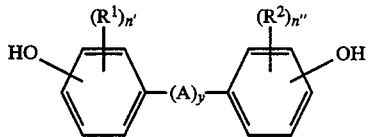

wherein:

$R^1$ is independently selected from halogen, monovalent hydrocarbon, and monovalent hydrocarbonoxy radicals;

$R^2$ is independently selected from halogen, monovalent hydrocarbon, and monovalent hydrocarbonoxy radicals;

A is selected from divalent hydrocarbon radicals,

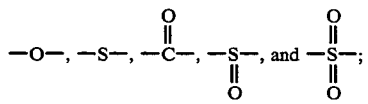

n' and n" are independently selected from integers having a value of from 0 to 4 inclusive; and y is either zero or one.

The monovalent hydrocarbon radicals represented by $R^1$ and $R^2$ include the alkyl, cycloalkyl, aryl, aralkyl, and alkaryl radicals.

The preferred alkyl radicals are those containing from 1 to about 12 carbon atoms. The preferred cycloalkyl radicals are those containing from 4 to about 12 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The preferred halogen radicals represented by $R^1$ and $R^2$ are chlorine and bromine.

The monovalent hydrocarbonoxy radicals may be represented by the general formula —$OR^3$ wherein $R^3$ has the same meaning as $R^1$ and $R^2$. The preferred hydrocarbonoxy radicals are the alkoxy and the aryloxy radicals.

The divalent hydrocarbon radicals represented by A include the alkylene, alkylidene, cycloalkylene, and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

Some illustrative non-limiting examples of suitable dihydric phenols include:
2,2-bis(4-hydroxyphenyl)propane (bisphenol-A);
2,2-bis(3,5-dimethyl-4-hydroxyphenyl)propane;
2,2-bis(3,5-dibromo-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)cyclododecane;
1,1-bis(4-hydroxyphenyl)decane;
1,4-bis(4-hydroxyphenyl)butane;
p,p'-dihydroxydiphenyl;
bis(4-hydroxyphenyl)ether;
1,1-bis(4-hyroxyphenyl)3,3,5-trimethylcyclohexane; and
4,4'-thiodiphenol.

Other useful dihydric phenols are described, inter alia, in U.S. Pat. Nos. 3,028,365; 2,999,835; 3,148,172; 3,271,368, 2,991,273; 3,271,367; 3,280,078; 3,014,891 and 2,999,846, all of which are incorporated herein by reference.

The carbonate precursors employed in the practice of the instant invention include the carbonyl halides, the bishaloformates, and the diarylcarbonates. The carbonyl halides include carbonyl bromide, carbonyl chloride, and mixtures thereof. Typical of the diarylcarbonates are diphenyl carbonate; di(halophenyl) carbonates such as di(chlorophenyl)carbonate, di(bromophenyl) carbonate, di(trichlorophenyl)carbonate, and di(tribromophenyl)carbonate; di(alkylphenyl)-carbonates such as di(tolyl)carbonate; dinaphthyl carbonate; di(halonaphthyl)carbonates; and naphthyl phenyl carbonate. The bishaloformates suitable for use herein include the bishaloformates of dihydric phenols such as the bischloroformates of hydroquinone and bisphenol-A; the bishaloformates of glycols such as the bischloroformates of ethylene glycol, neopentyl glycol, and polyethylene glycol.

The polycarbonates of the instant invention contain at least one recurring structural unit represented by the formula:

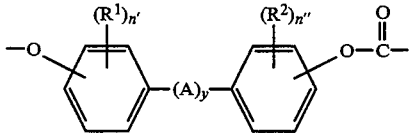

wherein:

A, $R^1$, $R^2$, n', n" and y are as defined hereinafore. Monofunctional phenols can be added as end capping agents to the polymerization to control molecular weight and provide desired properties.

The instant polycarbonates are high molecular weight aromatic carbonate polymers having an intrinsic viscosity, as determined in chloroform at 25° C. of from about 0.3 to about 1.5 dl/gm, preferably from about 0.45 to about 1.0 dl/gm. These polycarbonates may be branched or unbranched and generally will have a weight average molecular weight of from about 10,000 to about 200,000, preferably from about 20,000 to about 100,000 as measured by gel permeation chromatography.

The branched polycarbonates may be prepared by adding a branching agent during polymerization. These branching agents are well known and may comprise organic polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol,tris-phenol TC (1,3,5-tris((p-hydroxyphenyl)isopropyl)benzene),-trisphenol PA (4(4(1,1-bis(p-hydroxyphenyl)ethyl)alpha,alpha-dimethyl benzyl)phenol), 4-chloroformyl phthalic anhydride, trimesic acid and benzophenone tetracarboxylic acid.

The branching agent may be added at a level of about 0.05-2.0 weight percent. Branching agents and procedures for making branched polycarbonates are described in U.S. Pat. Nos. 3,635,895; 4,001,184; and 4,204,047 which are incorporated by reference.

In the practice of the present invention, it may be desirable to add an impact modifier which is based on a high molecular weight styrene-diene rubber.

A preferred class of rubber materials are copolymers, including random, block and graft copolymers of vinyl aromatic compounds and conjugated dienes. Exemplary of these materials there may be given hydrogenated, partially hydrogenated, or non-hydrogenated block copolymers of the A-B-A and A-B type wherein A is polystyrene and B is an elastomeric diene, e.g. polybutadiene, polyisoprene, radial teleblock copolymer of styrene and a Y conjugated diene, acrylic resin modified styrene-butadiene resins and the like; and graft copolymers obtained by graft-copolymerization of a monomer or monomer mix containing a styrenic compound as the main component to a rubber-like polymer. The rubber-like polymer used in the graft copolymer are as already described herein including polybutadiene, styrene-butadiene copolymer, acrylonitrile-butadiene copolymer, ethylene-propylene copolymer, ethylene butylene copolymer, polyacrylate and the like. The styrenic compounds includes styrene, methylstyrene, dimethylstyrene, isopropylstyrene, alphamethylstyrene, ethylvinyltoluene and the like.

Procedures for the preparation of these polymers are found in U.S. Pat. Nos. 4,196,116; 3,299,174 and 3,333,024, all of which are incorporated by reference.

The thermoplastic multi-block copolymer elastomers that are used in this invention are copolyetheresters and copolyetherimide esters.

The copolyetheresters consist essentially of a multiplicity of recurring long chain ester units and short chain ester units joined head-to-tail through ester linkages, said long chain ester units being represented by the formula:

(I)

and said short chain ester units being represented by the formula:

(II)

where G is a divalent radical remaining after the removal of terminal hydroxyl groups from a poly(alkylene oxide) glycol having a number average molecular weight of about 400-6,000; R is a divalent radical remaining after reaction of carboxyl groups from an aromatic dicarboxylic acid having a molecular weight less than about 300, and D is a divalent radical remaining after reaction of hydroxyl groups from a diol having a molecular weight less than about 250; provided said short chain ester units are about 20-85 percent by weight of said copolyetherester.

The term "long-chain ester units" as applied to units in a polymer chain of the copolyetherester refers to the reaction product of a long-chain glycol with a dicarboxylic acid. Such "long-chain ester units", which are a repeating unit in the copolyetherester, correspond to formula (I) above. The long-chain glycols are polymeric glycols having terminal (or as nearly terminal as possible) hydroxy groups and a molecular weight from about 400-6,000. The long-chain glycols used to prepare the copolyetheresters are poly(alkylene oxide) glycols. Representative long-chain glycols are poly-(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as ethylene oxide.

The term "short-chain ester units" as applied to units in a polymer chain of the copolyetherester refers to low molecular weight chain units having molecular weights less than about 550. They are made by reacting a low molecular weight diol (below about 250) with an aromatic dicarboxylic acid having a molecular weight below about 300, to form ester units represented by formula (II) above.

The term "low molecular weight diols" as used herein should be construed to include equivalent ester-forming derivatives, provided, however, that the molecular weight requirement pertains to the diol only and not to its derivatives.

Preferred are diols with 2-15 carbon atoms such as ethylene, propylene, tetramethylene, pentamethylene, 2,2-dimethyltrimethylene, hexamethylene, and decamethylene glycols, dihydroxycyclohexane, cyclohexane dimethanol, and the unsaturated 1,4-butenediol.

The term "dicarboxylic acids" as used herein, includes equivalents of dicarboxylic acids having two functional groups which perform substantially like dicarboxylic acids in reaction with glycols and diols in forming copolyetherester polymers. These equivalents include esters and ester-forming derivatives, such as acid anhydrides. The molecular weight requirement pertains to the acid and not to its equivalent ester or ester-forming derivative.

Among the aromatic dicarboxylic acids for preparing the copolyetherester polymers, those with 8-16 carbon atoms are preferred, particularly the phenylene dicarboxylic acids, i.e., phthalic, terephthalic and isophthalic acids and their dimethyl ester.

The short-chain ester units will constitue about 20-85 weight percent of the copolyetherester. The remainder of the copolyetherester will be long-chain ester units comprising about 15-80 weight percent of the copolyetherester.

Preferred copolyetheresters are those prepared from dimethyl terephthalate, 1,4-butanediol, and poly(tetramethylene oxide) glycol having a molecular weight of about 600–2,000. Optionally, up to about 30 mole percent of the dimethyl terephthalate in these polymers can be replaced by dimethyl phthalate or dimethyl isophthalate. Polymers in which a portion of the butanediol is replaced by butenediol are also preferred.

The dicarboxylic acids or their derivatives and the polymeric glycol are incorporated into the copolyetherester in the same molar proportions as are present in the reaction mixture. The amount of low molecular weight diol actually incorporatd corresponds to the difference between the moles of diacid and polymeric glycol present in the reaction mixture. When mixtures of low molecular weight diols are employed, the amounts of each diol incorporated depends on their molar concentration, boiling points and relative reactivities. The total amount of diol incorporated is still the difference between moles of diacid and polymeric glycol.

The copolyetheresters described herein are made by a conventional ester interchange reaction which, preferably, takes place in the presence of a phenolic antioxidant that is stable and substantially nonvolatile during the polymerization.

The copolyetherimide ester elastomers differ from the copolyetheresters only in that repeating hard segments and soft segments are joined through imidoester linkages rather than simple ester linkages. The hard segments in these elastomers consist essentially of multiple short chain ester units represented by the formula:

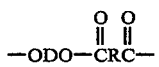
(II)

described hereinbefore. The soft segments in these polymers are derived from poly(oxyalkylene diimide) diacids whch can be characterized the following formula:

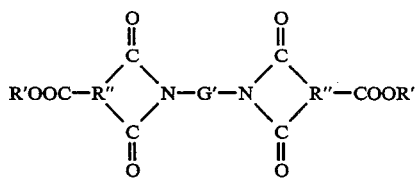

wherein each R" is independently a trivalent organic radical, preferably a $C_1$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g., benzyl, most preferably hydrogen; and G' is the radical remaining after the removal of the terminal (or as nearly terminal as possible) amino groups of a long chain ether diamine having an average molecular weight of from about 600 to about 12,000, preferably from about 900 to about 4,000.

Representative long chain ether glycols from which the polyoxyalkylene diamine is prepared include poly(ethylene ether)glycol; poly(propylene ether)glycol; poly(tetramethylene ether)glycol; random or block copolymers of ethylene oxide and propylene oxide, including propylene oxide terminated poly(ethylene ether)glycol; and random or block copolymers of tetrahydrofuran with minor amounts of a second monomer such as methyl tetrahydrofuran (used in proportion such that the carbon-to-oxygen mole ratio in the glycol does not exceed about 4.3). Especially preferred poly(alkylene ether) glycols are poly(propylene ether)glycol and poly(ethylene ether)glycols end capped with poly(propylene ether) glycol and/or propylene oxide.

In general, the polyoxyalkylene diamines will have an average molecular weight of from about 600 to 12,000, preferably from about 900 to about 4,000.

Useful in capping the polyoxyalkylene diamines are various tricarboxylic compounds. The tricarboxylic component may be a carboxylic acid anhydride containing an additional carboxylic group or the corresponding acid thereof containing two imide forming vicinal carboxyl groups in lieu of the anhydride group. Mixtures thereof are also suitable. The additional carboxylic group much be esterifiable and preferably is substantially nonimidizable.

The tricarboxylic acid materials can be characterized by the following formula:

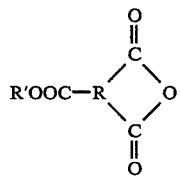

where R is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_6$ aliphatic or cycloaliphatic radicals and $C_6$ to $C_{12}$ aromatic radicals, e.g., phenyl; most preferably hydrogen. A preferred tricarboxylic component is trimellitic anhydride.

These copolymers are described in U.S. Pat. No. 4,988,740; U.S. Pat. No. 4,544,734; U.S. Pat. No. 4,556,688 and U.S. Pat. No. 4,579,884 all of which are incorporated by reference.

The preferred form of barium sulfate will have a particle size of 0.1–20 microns. The barium sulfate may be derived from a natural or a synthetic source. If desired, other reinforcing fillers or non-reinforcing fillers such as talc, clay, mica, glass spheres, wollastonite, and the like may be added. In addition, lubricants, flow aid, colorants, etc. may be added.

The filamentous glass to be employed as a reinforcing agent in the present compositions are well known to those skilled in the art and is widely available from a number of manufacturers. For compositions ultimately to be employed for electrical uses, it is preferred to use fibrous glass filaments comprised of lime-aluminum borosilicate glass that is relatively sodium free. This is known as "E" glass, however other glass compositions are useful. All such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diamenters preferably range from about 3 to about 20 microns, but this is not critical to the present invention. It is known, however to those skilled in the art, that smaller filament diameters will also increase the strength.

The length of the glass filaments and whether or not they are bundled into fibers and the fibers bundled in turn into yarns, ropes or rovings, or woven into mats, and the like are also not critical to the invention. However, in preparing the compositions of the present invention, it is convenient to use filamentous glass in the form of chopped strands of from one-eighth to about 2 inches long. In articles molded from the compositions, on the other hand, even shorter lengths will be encountered because, during compounding, considerable fragmentation will occur.

In the compositions which contain a polycarbonate resin, the stabilizers are used at a level of 0.01–10 weight percent and preferably at a level of from 0.05–2 weight percent. The stabilizers include an effective amount of an acidic phosphate salt; an acid, alkyl, aryl or mixed phosphite having at least one hydrogen or alkyl group; a Group IB or Group IIB metal phosphate salt; a phosphorous oxo acid, a metal acid pyrophosphate or a mixture thereof. The suitability of a particular compound for use as a stabilizer and the determination of how much is to be used as a stabilizer may be readily determined by preparing a mixture of the polyester component, the polycarbonate and the filler with and without the particular compound and determining the effect on melt viscosity or color stability or the formation of interpolymer. The acidic phosphate salts include sodium dihydrogen phosphate, mono zinc phosphate, potassium hydrogen phosphate, calcium hydrogen phosphate and the like. The phosphites may be of the formula:

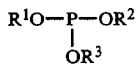

where $R^1$, $R^2$ and $R^3$ are independently selected from the group consisting of hydrogen, alkyl and aryl with the proviso that at least one of $R^1$, $R^2$ and $R^3$ is hydrogen or alkyl.

The phosphate salts of a Group IB or Group IIB metal include zinc phosphate, copper phosphate and the like. The phosphorous oxo acids include phosphorous acid, phosphoric acid, polyphosphoric acid or hypophosphorous acid.

The polyacid pyrophosphates of the formula:

wherein M is a metal, x is a number ranging from 1 to 12 and y is a number ranging 1 to 12, n is a number from 2 to 10, z is a number from 1 to 5 and the sum of $(xz)+y$ is equal to $n+2$.

These compounds include $Na_3HP_2O_7$; $K_2H_2P_2O_7$; $Na_4P_2O_7$; $KNaH_2P_2O_7$ and $Na_2H_2P_2O_7$. The particle size of the polyacid pyrophosphate should be less than 75 microns, preferably less than 50 microns and most preferably less than 20 microns.

Preferred compositions include the following:

| polybutylene terephthalate | 7–25 wt. % |
| polyethylene terephthalate | 3–10 wt. % |
| aromatic polycarbonate | 10–25 wt. % |
| stabilizer | 0.01–10 wt. % |
| impact modifier | 0–15 wt. % |
| barium sulfate | 40–79.99 wt. % |

Other preferred compositions include:

| polybutylene terephthalate | 15–30 wt. % |
| polyethylene terephthalate | 5–15 wt. % |
| branched arom. polycarbonate | 20–30 wt. % |
| stabilizer | 0.05–2 wt. % |

| -continued | |
|---|---|
| barium sulfate | 30–59.95 wt. % |
| polybutylene terephthalate | 6–10 wt. % |
| polyethylene terephthalate | 5–10 wt. % |
| polycarbonate | 12–20 wt. % |
| stabilizer | 0.01–5 wt. % |
| impact modifier | 1–10 wt. % |
| barium sulfate | 59–72.99 wt. % |
| polybutylene terephthalate | 15–50 wt. % |
| polyethylene terephthalate | 5–15 wt. % |
| polyetherimide ester | 5–15 wt. % |
| barium sulfate | 50–75 wt. % |

As used herein and in the appended claims, the term "weight percent" means the percent by weight of each component based on the total weight of composition.

The invention also includes the novel articles made from the compositions of the invention and methods of extrusion, blow molding, sheetforming and thermoforming.

These articles may comprise dishes, cups, countertops, sinks, shower stalls, building panels, figurines, toys, sports equipment, bathroom and kitchen fixtures, business machines, plumbing fixtures, tiles, floor coverings, doorknobs, drawer pulls, profile moldings, picture frames, musical instruments and the like.

The method of thermoforming is facilitated by the addition of a rubbery impact modifier and/or a polycarbonate or especially a branched polycarbonate to a highly filled composition, i.e. more than 50 weight percent of an inorganic filler such as barium sulfate, which includes a polybutylene terephthalate and/or a polyethylene terephthalate resin.

DESCRIPTION OF THE PREFERRED EMBODIMENTS

Examples 1–2

Thermoplastic compositions were prepared by tumble blending pre-dried components prior to extrusion using a single screw devolatilizing extruder.

| | 1 | 2 |
|---|---|---|
| PBT[a] | 26.3 | 17.1 |
| PET[b] | — | 10.0 |
| BaSO$_4$ | 63.5 | 37.0 |
| Polycarbonate[c] | — | 28.0 |
| Impact Modifier[d] | — | 7.5 |
| Polyetherimide ester[e] | 10 | — |
| Antioxidant[f] | 0.2 | 0.1 |
| Diphenyl isodecyl-phosphite | — | 0.1 |
| Mold Release[g] | — | 0.2 |

[a] polybutylene terephthalate, Valox ® 315, having a melt viscosity of 7250–9000 poise;
[b] polyethylene terephthalate having an IV of 0.57 dl/g as measured in a 60:40 mixture of phenol:tetra-chloroethane at 25° C.;
[c] polycarbonate derived from bisphenol-A and 0.4 weight percent trimellitic trichloride and phosgene, said polycarbonate having an IV of 0.58 dl/g as measured in chloroform at 25° C.;
[d] Kraton G 1651, Shell Chemical Co. an styrene-ethylene butylene-styrene copolymer;
[e] polyetherimide ester of butane diol, hexane diol, (65:35 wt. %) dimethylterephthalate and poly(tetramethylene ether)glycol 2000 wt. average mol. wt. (33% by weight);
[f] tetrakis(methylene-(3,5-di-tert-butyl-4-hydroxyhydro cinnamate)methane; and
[g] pentaerythritol tetrastearate.

The numbers for the components of Examples 1 and 2 are in weight percent.

The compositions were extruded using a 3 cm Killion extruder producing a 25 cm web at a maximum gauge of 3 mm. Samples were cut into 10"×8" sheets for coating.

Six different transparent coatings were applied to test sheets and the results of an evaluation of the properties of these coatings is shown on Table 1 and Table 2. Coatings applied to the composition of Example 1 are shown in Table 1 and coatings applied to the composition of Example 2 are shown in Table 2. These coatings had the following composition:

Coating A

Coating A is prepared by modifying Silvue 313 which is produced by Swedow Dow Corning Corp. This product is prepared by modifying Silvue (a dispersion of colloidal silica in glacial acetic acid and methyltrimethoxy silane prepared according to U.S. Pat. No. 3,986,997) by adding 1.4 weight percent of a silyl hydroxy benzophenone (SHBP-UV) produced according to U.S. Pat. No. 4,624,870, Example 1).

A primer for use with Coating A is an emulsion coating which contains:
- 178 g deionized water
- 80 g butyl cellosolve
- 12.7 g polyacrylate emulsion (Hycar26237)
- 12.7 g polyacrylate emulsion (Hycar26256)
- 7.2 g Uvinol-N539(2-ethylhexyl-2-cyano-3,3'-diphenylacrylate)
- 0.14 g citric acid (50% aqueous)
- 0.27 g Irganox 1076(octadecyl-3,5-ditert-butyl-4-hydroxyhydro-cinnamate The primer is cured for 90 minutes in a friction air oven at 260°-270° F. after flow coating and air drying for 20-30 minutes on the sheet. It is applied at a coating thickness of 0.5-0.75 μm. Coating A is flow coated onto the primed sheets, air dried for 20-30 minutes and cured for 90 minutes at 265°-270° F. in a friction air oven.

Coating B

Coating B is prepared by mixing 203 g of methyltrimethoxysilane and 1.25 g glacial acetic acid. Ludox AS (ammonium stabilized colloidal silica sol., 40% $SiO_2$ of 22 nm size, pH 9.2) with 41.5 g of deionized water to reduce the $SiO_2$ level to 30 weight percent, is added to the acidified methyltrimethoxysilane with stirring. The solution is stirred from 16-18 hours at room temperature and then 370 g of a 1:1 (by weight) isopropanol/n-butanol solvent blend and 35.0 g of SHBP UV screen (which is described in U.S. Pat. No. 4,624,870 Example 1) and 1.14 g of Silwet L720 (a flow control agent available from Union Carbide ) are added and stirred for about two weeks at room temperature. The resin is ready to use after about 3 to 4 weeks of aging from the day of its preparation. The composition has 20 weight percent solids and contains 13 weight percent SHBP based on solids ($SiO_2 + CH_3SiO_{1.5}$) and has a viscosity of about 5 cs at room temperature.

A primer which may be used in combinatiion with Coating B has the following formulation:
- 2 parts Elvacite 2041 (high mol. wt. polymethylmethacrylate, from Dupont)
- 0.5 parts Uvinol N-539
- 85 parts propylene glycol monomethyl ether
- 15 parts diacetone alcohol The primer is prepared by dissolving the polymer and the UV absorber in the solvents and applying the coating by flow coating. The primer is allowed to dry at room temperature. Coating B may be applied to the primed surface using the same method as described for Coating A.

Coating C

Type 1

- 100 parts of Resin A*;
- 3.0 parts of 2,4,6-trimethylbenzoyldiphenylacylphosphine oxide (Lucirin TPO available from BASF)
- 1.0 parts of benzophenone; and
- 100 parts of propylene glycol methyl ether.

*Resin A is prepared by mixing colloidal silica 6.7 parts (Nalcoag 1034A) (34% aqueous colloidal silica) 1.0 part methylacryloxypropyltrimethoxysilane and 0.005 parts of methoxyhydroquinone. The mixture is refluxed for 30 minutes and after the reaction mixture is allowed to cool, 2.8 parts of hexane dioldiacrylate are added with stirring. The solvents are removed by distillation under vacuum.

This coating is applied by flow coating, air dried for 20 minutes and cured using a UV-processor (Linde) at 15 fpm with two medium pressure mercury lamp (300 watt/inch) at full power.

Type 2

- 50 parts of Resin A;
- 50 parts of Araldite GU358(reaction product of D-glucitol with epichlorohydrin(CAS 68412-01-1 available from Ciba Geigy)
- 1.0 parts of Lucirin TPO
- 3.0 parts of triphenylsulfonium hexafluoroantimonate; and
- 300 parts of propylene glycol.

This coating is applied and cured using the same procedure that was employed for the application of Coating C, Type 1.

Type 3

- 50 part of Resin A;
- 50 parts of ERL 4221 (3,4-epoxycyclohexylmethyl-3,4-epoxycyclohexanecarboxylate(available from Union Carbide);
- 1.0 part of 2,4,6-trimethylbenzoyldiphenylacylphosphine oxide;
- 3.0 parts of triphenylsulfonium hexafluoroantimonate; and
- 100 parts of propylene glycol monomethyl ether.

This coating is applied and cured using the same procedure that was applied for the application of Coating C, Type 1.

Coating D

- 21.4 parts Cymel 301 (hexamethoxymethyl melamine, Monsanto)
- 13.2 parts R-830 (adhesion promoting coating from Morton Int.)
- 33.5 parts butyl cellosolve
- 13.7 parts 1,4-butane diol
- 0.6 parts Cyasorb UV531 (2-hydroxy-4-N-octyloxybenzophenone)
- 1.2 parts Uvinol N-35 (ethyl-2-cyano-3,3'-diphenylacrylate)
- 0.1 parts triethyl amine
- 0.3 parts Cycat 4040 (40% toluene sulfonic acid in 60% isopropyl alcohol)

All references to "parts" hereinabove is a reference to parts by weight per total weight of composition.

Evaluation

The sheets prepared as described above were tested as follows:
Water soak:

Using the procedure of ASTM D-3359-87, the test samples were immersed in deionized water at 65°, the result >100 means that there was no loss of coating adhesion after 100 hours of soaking.

Taber abrasion

This test was carried out according to the procedure set forth in ASTM D-1044. In the present test, weight loss rather than haze was measured after 500 cycles.

Gloss

60° gloss measured in accordance with ASTM D-523 on the coated and uncoated sheets.

Visual

The coatings were observed to determine if they gave a glossy, smooth, uniform appearance in all cases. All of the coatings that were tested had a satisfactory appearance.

Initial Adhesion

The initial adhesion was measured according to ASTM D-3359-87.

UV Resistance

A Q panel instrument using QUV-B bulbs with water condensation was used to measure color change ASTM D-4329. Irradiation cycle was 8 hours on and 4 hours off. Samples were held at 60° C. during the light cycle and 50° C. during the dark cycle.

YI

The YI was measured as per ASTM D-1925 and the change in yellowness was calculated from the X, Y, Z color values using the following equations:

$$YI = \frac{128X - (106Z)}{Y}$$

TABLE 1

Test Results:

| | Initial Adhesion | Water Soak | Abrasion Loss (wt. loss) | 60° Gloss |
|---|---|---|---|---|
| A | Good | >100 h | 2.2 mg | 15.0 |
| A (with primer) | Good | >100 h | 14.1 mg | 16 |
| C-1 | Good | >100 h | 3.6 mg | 45 |
| C-2 | Good | >100 h | 19.6 mg | 13 |
| C-3 | Good | >100 h | 13.9 mg | 49 |
| Uncoated Control | — | — | 56.0 mg | 4 |

TABLE 2

| Coating | Initial Adhesion | Water Soak | Abrasion Wt. Loss | 60° C. Gloss | YI |
|---|---|---|---|---|---|
| A | Good | >100 h | 2 mg | — | — |
| B | Fair | — | — | 42 | — |
| B (with primer) | Good | >100 h | 2 mg | 46 | 10 (850 h)** |
| D | Good | >100 h | 3 mg*** | 61 | 31 (850 h)** |
| Control (Uncoated) | — | — | 15 mg | 7 | 34–49* |

*range of color measured on the sample
**equals hours of radiation
***measured at 100 cycles Obviously, other modifications and variations of the present invention are possible in the light of the above teachings. For example, the mineral filled compositions can be rendered flame retardant or colored using conventional materials. It is, therefore, to be understood that changes may be made in the particular embodiments described above which are within the scope of the invention as defined in the appended claims.

We claim:

1. A method of coating a composition which comprises:
   (a) from 0–70 weight percent of a polybutylene terephthalate resin;
   (b) from 0–70 weight percent of a polyethylene terephthalate resin, with the proviso that the sum of the amounts of the polybutylene terephthalate resin and the polyethylene terephthalate resin must be at least 10 weight percent of the total composition;
   (c) from 0–35 weight percent of an aromatic polycarbonate resin wherein the resin of (a)+(b) is equal to or greater than (c);
   (d) an effective stabilizing amount of a stabilizer selected from the group consisting of phosphites, acidic phosphate salts, polyacid pyrophosphates and salts thereof, phosphates of Group IB and Group IIB metals, and phosphorous oxo-acids;
   (e) from 0–15 weight percent of a styrene-rubber impact modifier;
   (f) from 0–35 weight percent of a polyetherester or polyetherimide ester resin;
   (g) from 30–80 weight percent of an inorganic filler selected from the group consisting of barium sulfate, strontium sulfate, zirconium oxide, zinc oxide and zinc sulfate; and
   (h) from 0–30 percent of a fibrous glass reinforcing filler, said method comprising applying to said composition a curable transparent coating selected from the group consisting of:
      (a) a coating comprising a colloidal silica which is dispersed in a silanol, acrylic, methacrylic derived polymer system or mixture thereof; and
      (b) a coating comprising an aminoplast resin and thereafter curing said curable transparent coating composition under conditions which will cure said transparent coating.

2. A method as defined in claim 1 wherein the curable transparent coating is selected from the group consisting of:
   (A) a coating composition which is a dispersion of colloidal silica in a lower aliphatic alcohol-water solution of the partial condensate of a silanol of the formula RSi(OH)$_3$ in which R is selected from the group consisting of alkyl radicals of 1 to 3 carbon atoms, a vinyl radical, 3,3,3-trifluoropropyl radical, a gamma-methacryloxypropyl radical, at least 70 percent of the silanol being CH$_3$Si(OH)$_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0;
   (B) a silica-containg composition having an alkaline pH, comprising a water/aliphatic alcohol dispersion of ammonium hydroxide-stabilized colloidal silica and a partial condensate derived from organo-trialkoxy silanes;
   (C) an ultraviolet light curable coating which comprises 1–60 weight percent colloidal silica; 1–50 weight percent of the material produced by the hydrolysis of silyl acrylate and 25–90 weight percent of an acrylate monomer and 0.1–5 weight percent of a UV photoinitiator; or an ultraviolet light curable coating which comprises 100 parts by weight of colloidal silica; 5 to 500 parts of an acryloxy functional silane or glycidoxy functional silane; 10–500 parts by weight of a non-silyl acrylate and a catalytic amount of a light sensitive photoinitiator; and (D) a coating composition which is a reaction product of an aminoplast derived component and a polyester polyol consisting essentially of the reaction products of diacids and diols wherein said diacids comprise at least 50% by number of aliphatic acids in which the carbon atoms containing hydroxyl groups are separated by at least two intervening carbon atoms, and wherein the hydroxyl number is from about 50 to about 175; and thereafter curing said coating under curing conditions.

3. A method as defined in claim 2 wherein the coating composition is the coating composition of subpart (A).

4. A method as defined in claim 2 wherein the coating composition is the coating composition of subpart (B).

5. A method as defined in claim 2 wherein the coating composition is the coating composition of subpart (C).

6. A method as diefined in claim 2 wherein the coating composition is the coating composition of subpart (D).

7. The method of claim 1, wherein said inorganic filler is barium sulfate.

8. A method as defined in claim 1 wherein said method comprises coating an article formed from a composition comprising:
(a) from 7–15 weight percent of polybutylene terephthalate;
(b) from 3–10 weight percent of a polyethylene terephthalate;
(c) from 10–25 weight percent of an aromatic polycarbonate resin;
(d) from 0.01–10 weight percent of a stabilizer selected from the group consisting of phosphites, acidic phosphate salts, polyacid pyrophosphates and salts thereof; phosphates of a Group IB or a Group IIB metal and phosphorous oxo-acids;
(e) from 0–15 weight percent of a styrene rubber impact modifier, and
(f) from 40–79.99 weight percent of an inorganic filler selected from the group consisting of barium sulfate, zirconium oxide, strontium sulfate and zinc sulfate, with a curable coating composition selected from the group consisting of:
(A) a coating composition which is a dispersion of colloidal silica in a lower aliphatic alcohol-water solution of the partial condensate of a silanol of the formula RSi(OH)$_3$ in which R is selected from the group consisting of alkyl radicals of 1 to 3 carbon atoms, a vinyl radical, 3,3,3-trifluoropropyl radical, a gamma-methacryloxypropyl radical, at least 70 percent of the silanol being CH$_3$Si(OH)$_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0;
(B) a silica-containg composition having an alkaline pH, comprising a water/aliphatic alcohol dispersion of ammonium hydroxide-stabilized colloidal silica and a partial condensate derived from organo-trialkoxy silanes;
(C) an ultraviolet light curable coating which comprises 1–60 weight percent colloidal silica; 1–50 weight percent of the material produced by the hydrolysis of silyl acrylate and 25–90 weight percent of an acrylate monomer and 0.1–5 weight percent of a UV photoinitiator; or an ultraviolet light curable coating which comprises 100 parts by weight of colloidal silica; 5 to 500 parts of an acryloxy functional silane or glycidoxy functional silane; 10–500 parts by weight of a non-silyl acrylate and a catalytic amount of a light sensitive photoinitiator; and (D) a coating composition which is a reaction product of an aminoplast derived component and a polyester polyol consisting essentially of the reaction products of diacids and diols wherein said diacids comprise at least 50% by number of aliphatic acids in which the carbon atoms containing hydroxyl groups are separated by at least two intervening carbon atoms, and wherein the hydroxyl number is from about 50 to about 175; and thereafter curing said coating under curing conditions.

9. A method as defined in claim 8 wherein the coating composition is the coating composition of subpart (A).

10. A method as defined in claim 8 wherein the coating composition is the coating composition of subpart (B).

11. A method as defined in claim 8 wherein the coating composition is the coating composition of subpart (C).

12. A method as defined in claim 8 wherein the coating composition is the coating composition of subpart (D).

13. A method as defined in claim 8 herein the stabilizer is selected from the group consisting of acidic phosphate compounds; phosphites of the formula:

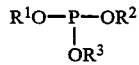

wherein R$^1$, R$^2$ R$^3$ are independently selected from the group consisting of hydrogen, alkyl and aryl with the proviso that at least one of R$^1$, R$^2$ and R$^3$ is hydrogen or alkyl; polyacid pyrophosphates of the formula:

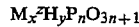

wherein M is a metal, x is a number from 1–12 and y is a number from 2–10; z is a number from 1–5 and the sum of (xz)+y=n+2; phosphorous oxo-acids and phosphates of Group IB or Group IIB metals and mixtures thereof.

14. A process as defined in claim 1 wherein the composition contains 5–30 weight percent of a fibrous glass reinforcing filler.

15. An article which is made by the process of claim 14.

16. An article which is made by the process of claim 1.

17. An article which is made by the process of claim 8.

18. A method of coating a composition which comprises:
(a) from 0–30 weight percent of a polybutylene terephthalate resin;
(b) from 0–30 weight percent of a polyethylene terephthalate resin, with the proviso that the sum of the amounts of the polybutylene terephthalate resin and the polyethylene terephthalate resin must be at least 10 weight percent of the total composition;

(c) from 10–30 weight percent of an aromatic polycarbonate resin;

(d) an effective stabilizing amount of a stabilizer selected from the group consisting of phosphites, acidic phosphate salts, polyacid pyrophosphates and salts thereof, phosphate salts of Group IB or Group IIB metals and phosphorous oxo-acids;

(e) from 0–10 weight percent of a styrene-rubber impact modifier;

(f) from 30–79.99 weight percent of an inorganic filler selected from the group consisting of barium sulfate, strontium sulfate, zirconium oxide and zinc sulfate; and (g) from 0–30 percent of a fibrous glass reinforcing filler;

said method comprising applying to said composition a curable transparent coating selected from the group consisting of:

(a) a coating comprising a colloidal silica which is dispersed in a silanol, acrylic, methacrylic derived polymer system or mixture thereof; and (b) a coating comprising an aminoplast resin and thereafter curing said curable transparent coating composition under conditions which will cure said transparent coating.

19. A method as defined in claim 18 wherein the curable transparent coating is selected from the group consisting of:

(A) a coating composition which is a dispersion of colloidal silica in a lower aliphatic alcohol-water solution of the partial condensate of a silanol of the formula RSi(OH)$_3$ in which R is selected from the group consisting of alkyl radicals of 1 to 3 carbon atoms, a vinyl radical, 3,3,3-trifluoropropyl radical, a gamma-methacryloxypropyl radical, at least 70 percent of the silanol being CH$_3$Si(OH)$_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0;

(B) a silica-containg composition having an alkaline pH, comprising a water/aliphatic alcohol dispersion of ammonium hydroxide-stabilized colloidal silica and a partial condensate derived from organo-trialkoxy silanes;

(C) an ultraviolet light curable coating which comprises 1–60 weight percent colloidal silica; 1–50 weight percent of the material produced by the hydrolysis of silyl acrylate and 25–90 weight percent of an acrylate monomer and 0.1–5 weight percent of a UV photoinitiator; or an ultraviolet light curable coating which comprises 100 parts by weight of colloidal silica; 5 to 500 parts of an acryloxy functional silane or glycidoxy functional silane; 10–500 parts by weight of a non-silyl acrylate and a catalytic amount of a light sensitive photoinitiator; and (D) a coating composition which is a reaction product of an aminoplast derived component and a polyester polyol consisting essentially of the reaction products of diacids and diols wherein said diacids comprise at least 50% by number of aliphatic acids in which the carbon atoms containing hydroxyl groups are separated by at least two intervening carbon atoms, and wherein the hydroxyl number is from about 50 to about 175; and thereafter curing said coating under curing conditions.

20. A method as defined in claim 19 wherein the coating composition is the coating composition of subpart (A).

21. A method as defined in claim 8 wherein the coating composition is the coating composition of subpart (B).

22. A method as defined in claim 19 wherein the coating composition is the coating composition of subpart (C).

23. A method as defined in claim 19 wherein the coating composition is the coating composition of subpart (D).

24. An article which is made by the process of claim 18.

25. A method of coating a composition of a article formed from a composition which comprises:

(a) from 6–10 weight percent polybutylene terephthalate;

(b) from 5–10 weight percent of a polyethylene terephthalate;

(c) from 12–20 weight percent of an aromatic polycarbonate wherein in said molding composition, the ratio of polybutylene terephthalate to polyethylene terephthalate to aromatic polycarbonate is about 2:1:3;

(d) from 0.01–5 weight percent of a stabilizer;

(e) from 1–10 weight percent of a styrene-rubber impact modifier; and (f) from 59–72.99 weight percent of barium sulfate, said method comprising applying to said article a curable composition selected from the group consisting of:

(A) a coating composition which is a dispersion of colloidal silica in a lower aliphatic alcohol-water solution of the partial condensate of a silanol of the formula RSi(OH)$_3$ in which R is selected from the group consisting of alkyl radicals of 1 to 3 carbon atoms, a vinyl radical, 3,3,3-trifluoropropyl radical, a gamma-methacryloxypropyl radical, at least 70 percent of the silanol being CH$_3$Si(OH)$_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0;

(B) a silica-containg composition having an alkaline pH, comprising a water/aliphatic alcohol dispersion of ammonium hydroxide-stabilized colloidal silica and a partial condensate derived from organo-trialkoxy silanes;

(C) an ultraviolet light curable coating which comprises 1–60 weight percent colloidal silica; 1–50 weight percent of the material produced by the hydrolysis of silyl acrylate and 25–90 weight percent of an acrylate monomer and 0.1–5 weight percent of a UV photoinitiator; or an ultraviolet light curable coating which comprises 100 parts by weight of colloidal silica; 5 to 500 parts of an acryloxy functional silane or glycidoxy functional silane; 10–500 parts by weight of a non-silyl acrylate and a catalytic amount of a light sensitive photoinitiator; and (D) a coating composition which is a reaction product of an aminoplast derived component and a polyester polyol consisting essentially of the reaction products of diacids and diols wherein said diacids comprise at least 50% by number of aliphatic acids in which the carbon atoms containing hydroxyl groups are separated by at least two intervening carbon atoms, and wherein the hydroxyl number is from about 50 to about 175; and thereafter curing said coating under curing conditions.

26. A method as defined in claim 25 wherein the coating composition is the coating composition of subpart (A).

27. A method as defined in claim 25 wherein the coating composition is the coating composition of subpart (B).

28. A method as defined in claim 25 wherein the coating composition is the coating composition of subpart (C).

29. A method as diefined in claim 25 wherein the coating composition is the coating composition of subpart (D).

30. A method as defined in claim 25 wherein the stabilizer is an acid phosphate compound.

31. A method as defined in claim 25 wherein the stabilizer is selected from the group consisting of phosphites of the formula:

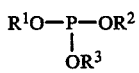

wherein $R^1$, $R^2$ and $R^3$ are independently selected from the group consisting of hydrogen, alkyl, and aryl with the proviso that at least one of $R^1$, $R^2$ and $R^3$ is hydrogen or alkyl; phosphate salts of a Group IB or Group IIB metal and polyacid pyrophosphates of the formula:

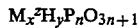

wherein M is a metal, x is a number from 1–12 and y is a number from 2–10; z is a number from 1–5 and the sum of $(xz)+y=n+2$; and phosphorous oxo-acids.

32. An article which is made by the process of claim 25.

33. A method of coating an article formed from a composition which comprises:
(a) polybutylene terephthalate 0–70 weight percent;
(b) polyethylene terephthalate 0–70 weight percent;
(c) polyether ester or polyetherimide ester 0–35 weight percent; with the proviso that the weight of (a)+(b) is at least equal to or greater than (c) and that the weight of (a)+(b) is at least 10% by weight of total composition;
(d) from 30–80 weight percent of an inorganic filler selected from the group consisting of barium sulfate, strontium sulfate, zirconium oxide, zinc oxide and zinc sulfate; and
(e) from 0–30 percent of a fibrous glass reinforcing filler,
said method comprising applying to said composition a curable transparent coating selected from the group consisting of:
(a) a coating comprising a colloidal silica which is dispersed in a silanol, acrylic, methacrylic derived polymer system, or mixture thereof; or
(b) a coating comprising an aminoplast resin; and thereafter curing said curable transparent coating under conditions which will cure said transparent coating.

34. A method as defined in claim 33 wherein the curable transparent coating is selected from the group consisting of:
(A) a coating composition which is a dispersion of colloidal silica in a lower aliphatic alcohol-water solution of the partial condensate of a silanol of the formula $RSi(OH)_3$ in which R is selected from the group consisting of alkyl radicals of 1 to 3 carbon atoms, a vinyl radical, 3,3,3-trifluoropropyl radical, a gamma-methacryloxypropyl radical, at least 70 percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0;
(B) a silica-containg composition having an alkaline pH, comprising a water/aliphatic alcohol dispersion of ammonium hydroxide-stabilized colloidal silica and a partial condensate derived from organo-trialkoxy silanes;
(C) an ultraviolet light curable coating which comprises 1–60 weight percent colloidal silica; 1–50 weight percent of the material produced by the hydrolysis of silyl acrylate and 25–90 weight percent of an acrylate monomer and 0.1–5 weight percent of a UV photoinitiator; or an ultraviolet light curable coating which comprises 100 parts by weight of colloidal silica; 5 to 500 parts of an acryloxy functional silane or glycidoxy functional silane; 10–500 parts by weight of a non-silyl acrylate and a catalytic amount of a light sensitive photoinitiator; and
(D) a coating composition which is a reaction product of an aminoplast derived component and a polyester polyol consisting essentially of the reaction products of diacids and diols wherein said diacids comprise at least 50% by number of aliphatic acids in which the carbon atoms containing hydroxyl groups are separated by at least two intervening carbon atoms, and wherein the hydroxyl number is from about 50 to about 175; and thereafter curing said coating under curing conditions.

35. A method as defined in claim 33 wherein the coating composition is the coating composition of subpart (A).

36. A method as defined in claim 33 wherein the coating composition is the coating composition of subpart (B).

37. A method as defined in claim 33 wherein the coating composition is the coating composition of subpart (C).

38. An article which is made by the process of claim 33.

39. A method of coating a article formed from a composition which comprises:
(a) polybutylene terephthalate 15–30 weight percent;
(b) polyethylene terephthalate 5–15 weight percent;
(c) polyether ester or polyetherimide ester 5–15 weight percent;
(d) barium sulfate 40–75 weight percent; said method comprising applying to said article a coating composition selected from the group consisting of:
(A) a coating composition which is a dispersion of colloidal silica in a lower aliphatic alcohol-water solution of the partial condensate of a silanol of the formula $RSi(OH)_3$ in which R is selected from the group consisting of alkyl radicals of 1 to 3 carbon atoms, a vinyl radical, 3,3,3-trifluoropropyl radical, a gamma-methacryloxypropyl radical, at least 70 percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0;

(B) a silica-containing composition having an alkaline pH, comprising a water/aliphatic alcohol dispersion of ammonium hydroxide-stabilized colloidal silica and a partial condensate derived from organo-trialkoxy silanes;

(C) an ultraviolet light curable coating which comprises 1–60 weight percent colloidal silica; 1–50 weight percent of the material produced by the hydrolysis of silyl acrylate and 25–90 weight percent of an acrylate monomer and 0.1–5 weight percent of a photoinitiator; or an ultraviolet light curable coating which comprises 100 parts by weight of colloidal silica; 5 to 500 parts of an acryloxy functional silane or glycidoxy functional silane; 10–500 parts by weight of a non-silyl acrylate and a catalytic amount of a light sensitive photoinitiator; and (D) a coating composition which is a reaction product of an aminoplast derived component and a polyester polyol consisting essentially of the reaction products of diacids and diols wherein said diacids comprise at least 50% by number of aliphatic acids in which the carbon atoms containing hydroxyl groups are separated by at least two intervening carbon atoms, and wherein the hydroxyl number is from about 50 to about 175; and thereafter curing said coating under curing conditions.

40. A method as defined in claim 39 wherein the coating composition is the coating composition of subpart (A).

41. A method as defined in claim 39 wherein the coating composition is the coating composition of subpart (B).

42. A method as defined in claim 39 wherein the coating composition is the coating composition of subpart (C).

43. A method as defined in claim 39 wherein the coating composition is the coating composition of subpart (D).

44. An abrasion resistant coating for highly filled polyester-containing compositions with suitable adherence thereto, comprising:

(a) from 0–70 weight percent of a polybutylene terephthalate resin;

(b) from 0.14 70 weight percent of a polyethylene terephthalate resin, with the proviso that the sum of the amounts of the polybutylene terephthalate resin and the polyethylene terephthalate resin must be at least 10 weight percent of the total composition;

(c) from 0–35 weight percent of an aromatic polycarbonate resin wherein the resin of (a)+(b) is equal to or greater than (c);

(d) an effective stabilizing amount of a stabilizer selected from the group consisting of phosphites, acidic phosphate salts, polyacid pyrophosphates and salts thereof, phosphates of Group IB or Group IIB metals, and phosphorus oxo-acids;

(e) from 0–15 weight percent of a styrene-rubber impact modifier;

(f) from 0–35 weight percent of a polyetherester or polyetherimide ester resin;

(g) from 30–80 weight percent of an inorganic filler selected from the group consisting of barium sulfate, strontium sulfate, zirconium oxide, zinc oxide and zinc sulfate; and (h) from 0–30 percent of a fibrous glass reinforcing filler;

(i) a curable transparent coating selected from the group consisting of
a coating comprising a colloidal silica which is dispersed in a silanol and/or acrylic or methacrylic derived polymer system; and
a coating comprising an aminoplast resin.

* * * * *